(12) United States Patent
Bostanjoglo et al.

(10) Patent No.: US 7,182,580 B2
(45) Date of Patent: Feb. 27, 2007

(54) LAYER SYSTEM, AND PROCESS FOR PRODUCING A LAYER SYSTEM

(75) Inventors: Georg Bostanjoglo, Berlin (DE); Nigel-Philip Cox, Berlin (DE); Rolf Wilkenhöner, Kleinmachnow (DE)

(73) Assignee: Siemens Aktiengesellschaft, Munich (DE)

( * ) Notice: Subject to any disclaimer, the term of this patent is extended or adjusted under 35 U.S.C. 154(b) by 134 days.

(21) Appl. No.: 10/957,438

(22) Filed: Oct. 1, 2004

(65) Prior Publication Data

US 2005/0214121 A1  Sep. 29, 2005

(30) Foreign Application Priority Data

Oct. 2, 2003  (EP) .................................. 03022540

(51) Int. Cl.
*F01D 5/28* (2006.01)
(52) U.S. Cl. ................ 416/229 A; 416/241 B
(58) Field of Classification Search ............ 416/229 A, 416/229 R, 241 R, 241 B; 415/200; 428/609, 428/614, 632
See application file for complete search history.

(56) References Cited

U.S. PATENT DOCUMENTS

| 5,869,798 | A |  | 2/1999 | Ryu et al. |  |
|---|---|---|---|---|---|
| 5,900,102 | A | * | 5/1999 | Reeves | 156/344 |
| 6,015,630 | A | * | 1/2000 | Padture et al. | 428/632 |
| 6,306,517 | B1 | * | 10/2001 | Gray et al. | 428/469 |
| 6,398,503 | B1 | * | 6/2002 | Takahashi et al. | 416/241 B |
| 6,720,087 | B2 | * | 4/2004 | Fried et al. | 428/614 |
| 2002/0146584 | A1 | * | 10/2002 | Fried | 428/609 |

FOREIGN PATENT DOCUMENTS

| DE | 30 38 416 A1 | 8/1981 |
|---|---|---|
| DE | 100 57 187 A1 | 5/2002 |
| EP | 0 713 957 A1 | 5/1996 |
| EP | 1 275 748 A2 | 1/2003 |

OTHER PUBLICATIONS

Anthony J. Pedraza, Mukund J. Godbole, Douglas H. Lowndes, James R. Thompson, Jr., "Enhanced metal-ceramic adhesion by sequential sputter deposition and pulsed laser melting of copper films on sapphire substrates", Journal of Materials Science, Jan. 1989, pp. 115-123, No. 1, London, GB.

* cited by examiner

*Primary Examiner*—Edward K. Look
*Assistant Examiner*—Nathan Wiehe

(57) ABSTRACT

On account of their form of coating, layer systems according to the prior art often only have a low level of attachment to the substrate. The layer may then become detached in the event of high mechanical loads being applied to the components. The layer system according to the invention has separately produced anchoring means which are more strongly attached to the substrate than the attachment of the layer to the substrate.

14 Claims, 4 Drawing Sheets

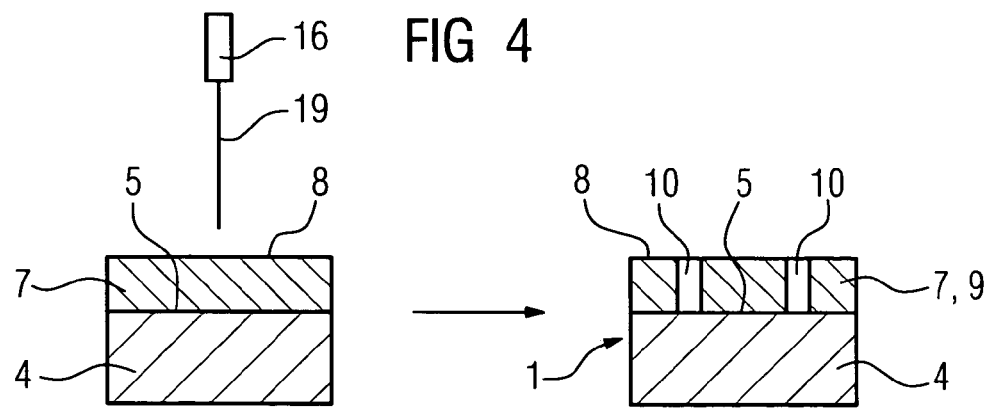
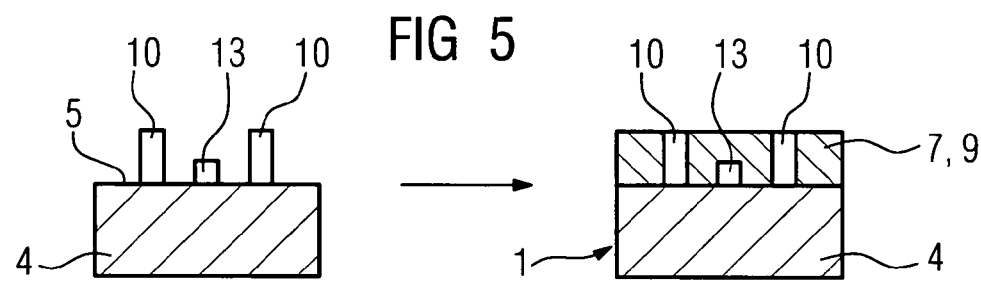
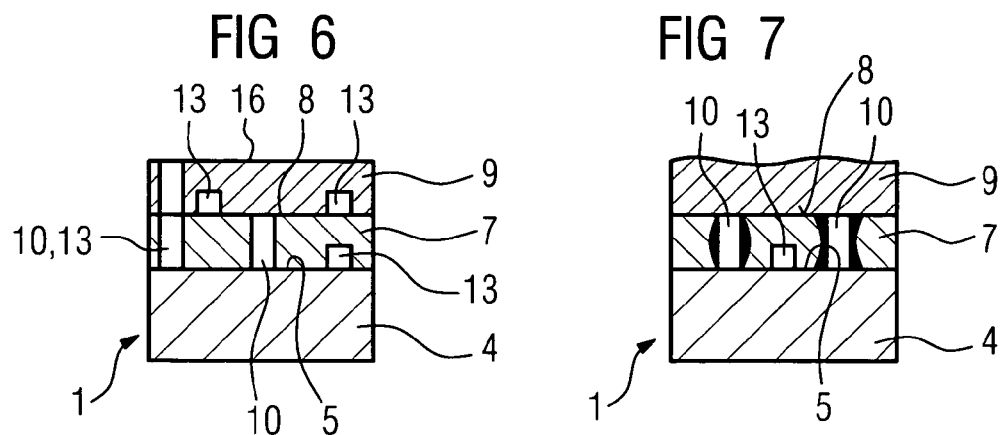
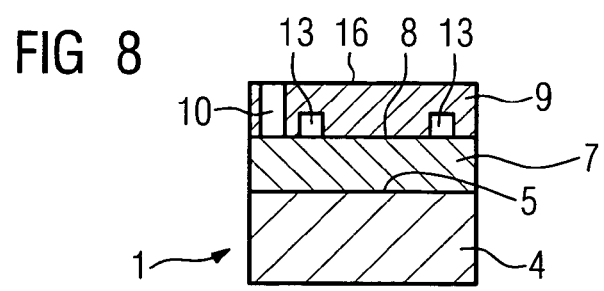

LAYER SYSTEM, AND PROCESS FOR PRODUCING A LAYER SYSTEM

CROSS REFERENCE TO RELATED APPLICATION

This application claims priority of the European application No. 03022540.3 EP filed Oct. 2, 2003, which is incorporated by reference herein in its entirety.

FIELD OF THE INVENTION

The invention relates to a layer system, and to processes for producing a layer system.

BACKGROUND OF THE INVENTION

Nowadays, components which are to be exposed to high temperatures are generally provided with protective layers. These may be metallic corrosion-resistant layers (MCrAlX layers) or ceramic thermal barrier coatings, as well as layer systems comprising metallic corrosion-resistant layers and ceramic thermal barrier coatings. Plasma-enhanced powder-spraying processes are used as coating processes for these coatings, on account of their relatively favorable economics. Layers of this type are attached to the substrate by mechanical interlocking and subsequent diffusion heat treatment. In some cases, the layer may become detached in operation in regions which are subject to high levels of loading or at unfavorable locations on the component, i.e. at locations which are subject to high mechanical loads. Flaking of the layer during operation causes damage to the base material, thereby significantly reducing the service life of the component.

Therefore, it is an object of the invention to provide a layer system and a process for producing a layer system with better attachment of a protective layer to a substrate and/or of layers to one another.

SUMMARY OF THE INVENTION

The object is achieved by a layer system and by a process for producing a layer system The layer system according to the invention has separately produced anchoring means which have a very strong attachment to the substrate or to a layer arranged beneath them on the substrate and are attached to the substrate or the other layer in a different way than the layer.

The stronger attachment of the anchoring means compared to the existing layer bonding (e.g. mechanical interlocking provided by surface roughness) is effected, for example, by melt-metallurgy bonding, which is produced in a separate process. Therefore, it is also possible to use the inexpensive and economical plasma-spraying process in order to apply the layer.

Further advantageous measures are listed in the subclaims.

BRIEF DESCRIPTION OF THE DRAWINGS

The measures listed in the subclaims can advantageously be combined with one another. In the drawing:

FIGS. 2, 6, 7, 8 show layer systems designed in accordance with the invention,

FIG. 4 shows steps involved in a process according to the invention, FIG. 5 shows steps involved in another process according to the invention.

DETAILED DESCRIPTION OF THE INVENTION

Figure 1:
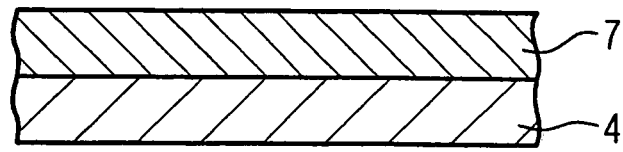
FIG. 1 shows a layer system according to the prior art.

FIG. 1 shows a layer system according to the prior art. The layer system has a substrate 4. The substrate 4 may be metallic or ceramic and in the case of gas turbine components is produced in particular from an iron-, nickel- or cobalt-based superalloy.

At least one layer 7, 9 (two layers in FIGS. 6, 7, 8) is present on the substrate 4. This may be a metallic and/or ceramic layer 7, 9.

For turbine blades or vanes 120, 130 (FIG. 9), by way of example, a metallic corrosion-resistant layer 7 (FIGS. 6, 7, 8) of type MCrAlX is applied to the substrate 4, and then in addition an outer thermal barrier coating 9, for example a ceramic thermal barrier coating 9 (FIGS. 6, 7, 8), is also applied.

The interlayer 7 is attached to the substrate 4, or the layers 7, 9 are attached to one another, purely by mechanical interlocking (surface roughness) to the underlying surface, followed by a diffusion heat treatment, in accordance with the prior art.

Figure 2:
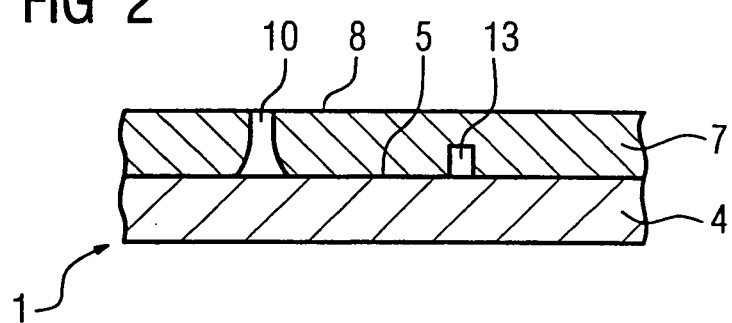

FIG. 2, which proceeds from FIG. 1, shows a layer system 1 according to the invention. Anchoring means 10, 13 are present on the surface 5 of the substrate 4. The anchoring means 10, 13 have a form of attachment to the surface 5 which results in an increased attachment force (more accurately: force per unit contact area) to the surface 5 compared to the form of attachment of the interlayer 7 to the surface 5.

The anchoring means 10, 13 are attached to the substrate 4, by way of example, by melt metallurgy by means of a suitably executed laser welding process. It is also conceivable for the layer 7 to be applied at defined locations by laser cladding (laser powder coating), so as to form anchoring means 10, 13. The anchoring means 10, 13 may also be cast on or produced integrally during casting of the substrate 4. The anchoring means 10, 13 form bonding bridges for the layer 7, 9 surrounding the anchoring means 10, 13. The anchoring means 10 may extend from the surface 5 of the substrate 4 to the outer surface 8 of the interlayer 7, or alternatively the anchoring means 13 may be covered by the layer 7, so that the anchoring means 13 do not extend all the way to the surface 8 of the layer 7, i.e. are arranged so as to end within the layer 7, 9. In this case, the anchoring means 13 extend at least 10%, 20%, 30%, 40% of the thickness of the layer 7, 9 into the layer 7, 9.

The anchoring means 10, 13 are, for example, only present locally, i.e. in a spatially delimited manner (FIG. 3) on the substrate 4 or the layer 7, specifically wherever the mechanical loading is highest. This is, for example, the region of the leading edge of a turbine blade or vane 120, 130. The remainder of the blade or vane would then not have any anchoring means.

Figure 3:
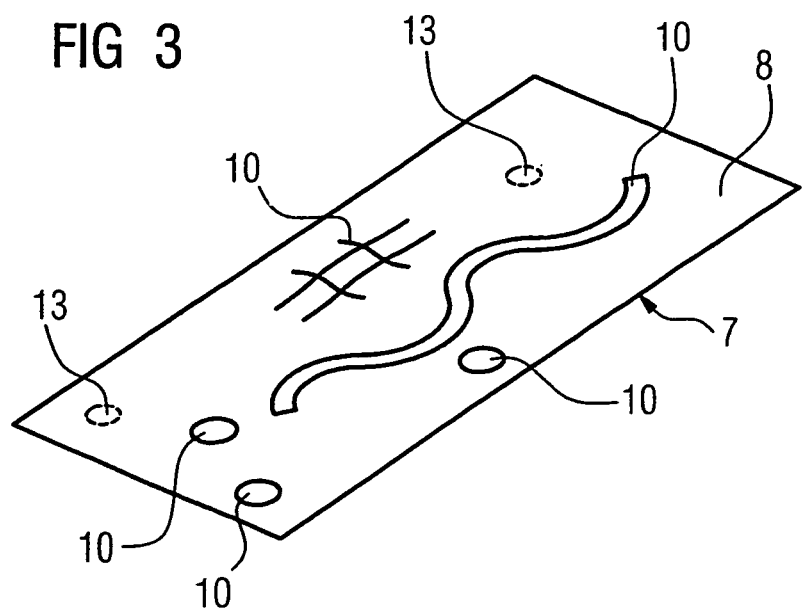
FIG. 3 shows a perspective plan view of a layer system configured in accordance with the invention.

FIG. 3 shows a plan view of a surface 8 of a layer 7. In this illustration, the anchoring means 13, which do not extend all the way to the surface 8 of the layer 7, are indicated by dashed lines. The anchoring means 10, 13 may have various geometries on the surface 5, for example circles, stitch seams (i.e. elongate and crossing one another), wavy shapes, parallel paths and combinations thereof.

FIG. 6 shows a further layer system 1 formed in accordance with the invention.

The layer system 1 comprises a substrate 4 and two layers 7, 9.

The interlayer 7 is, for example, a metallic MCrAlX layer, and the outer layer 9 is, for example, a ceramic thermal barrier coating 9 on the interlayer 7.

Anchoring means 10, 13 are present both in the interlayer 7 and in the outer layer 9.

However, the interlayer 7 does not have to have anchoring means 10, 13 in the sense of the present invention (FIG. 8). Equally, the anchoring means may be present only in the interlayer 7 (FIG. 7).

The anchoring means 10, 13 in the layers 7, 9 may extend from the surface 5, 8 of the substrate 4 or the interlayer 7 to the outer surface 8, 16 of the layer 7, 9 or may be covered by the layers 7, 9, so that the anchoring means 13 do not extend all the way to the surface 8, 16 of the layers 7, 9.

The anchoring means 10, 13 in the interlayer 7 improve the attachment of the interlayer 7 to the substrate 4. The material of the anchoring means 10 in the layer 7 may, for example, also be selected in such a way as to produce improved bonding of the outer layer 9 to the anchoring means 10 (FIG. 7). By way of example, it is possible for the material of the anchoring means 10 in the interlayer 7 to be ceramic, so that the ceramic thermal barrier coating 9 can be more successfully joined to the anchoring means 10, which extend as far as the surface 8 of the interlayer 7, or the anchoring means 10 serve as a growth nucleus, in particular for epitaxial growth, when the interlayer 7 is being coated with the ceramic material of the outer layer 9.

The material composition of the anchoring means 10, 13 in the layers 7, 9 is selected appropriately according to the particular requirements.

The anchoring means 10, 13 are present in particular in highly thermally and/or mechanically loaded regions.

The layer system 1 is, for example, a component of a gas turbine 100 (FIG. 9) (or aircraft turbine) or a steam turbine. Components of the turbines which are subject to high thermal loads have a layer system of this type, for example turbine blades or vanes 120, 130, linings 155 of a combustion chamber 110 and further parts of housing which are located along the flow path of a hot steam or hot gas.

The layer system 1 may be applied to a newly produced component and to components which have been refurbished after use. In this case, degraded layers are first removed from the components, any cracks are repaired and the substrate 4 is then recoated.

FIG. 7 shows a further exemplary embodiment of a layer system 1 according to the invention. In this layer system 1, the anchoring means 10, 13 are present only in the interlayer 7. The outer layer 9 is present on the interlayer 7. A contact surface of the anchoring means 10 at the surface 8 improves the bonding of the outer layer 9 compared to a comparable contact surface with the interlayer 7. This is achieved, for example, by virtue of the fact that the contact surfaces of the anchoring means 10 at the surface 8 form nucleus points for, for example, epitaxial growth of an outer layer 9 on the interlayer 7. Even without an interlayer 7 (FIGS. 4, 5, right), an improved layer system 1 is achieved by virtue of the fact that the anchoring means 10, 13 lead to improved attachment of the outer layer 9 to the substrate 4.

FIG. 8 shows a further exemplary embodiment of a layer system 1 according to the invention. In this exemplary embodiment, the anchoring means 10, 13 are present only in the outer layer 9, i.e. they are present on the interlayer 7 and lead to improved attachment of the outer layer 9 to the underlying interlayer 7. The anchoring means 10, 13 are then bonded to the surface 8 of the interlayer 7.

FIG. 4 shows, by way of example, steps involved in a process according to the invention for producing a layer system 1. In a first step, the at least one layer 7, 9 is applied in a known way to the substrate 4 or to a layer which is already present on the substrate.

The layer 7, 9 is treated with a laser 16 or an electron beam gun 16, which emits a corresponding laser or electron beam 19. This form of treatment causes the material of the layer 7, 9 to be locally transformed, for example melted, all the way down to the surface 5, 8 of the substrate 4 or the interlayer 7, resulting in melt-metallurgy attachment of material from the layer 7, 9 to the substrate 4 or a layer which has already been applied thereto. This process produces anchoring means 10 which extend from the surface 5, 8 to the surface 8, 16 of the layer 7, 9.

The anchoring means 10 are, for example, columnar in form, and may also be designed with a concave or convex curvature (FIG. 7).

FIG. 5 shows a further example of a process according to the invention.

In a first step, first of all the anchoring means 10, 13 are applied to the substrate 4 or the layer 7, i.e. are produced separately. This can be effected in various ways, such as for example by a suitably executed laser welding process or laser cladding. The anchoring means 10, 13 have a very strong, in particular melt-metallurgy attachment to the surface 5, 8 of the substrate 4 or of the interlayer 7.

However, the anchoring means 10, 13 may also have been produced during the production of the substrate 4, for example by means of a casting process.

In a subsequent process, the layer 7, 9 is applied, with the anchoring means 10, 13 being surrounded by the material of the layer 7, 9 and forming bonding bridges for the layer 7, 9.

The material of the anchoring means 10, 13 may be the same as the material of the layer 7, 9, the same as the material of the substrate 4 or the same as the material of a following layer, or may also have a different material composition. The material of the anchoring means 10, 13 in the layer 7 does not necessarily have to be identical to the material of the substrate 4.

Figure 9:
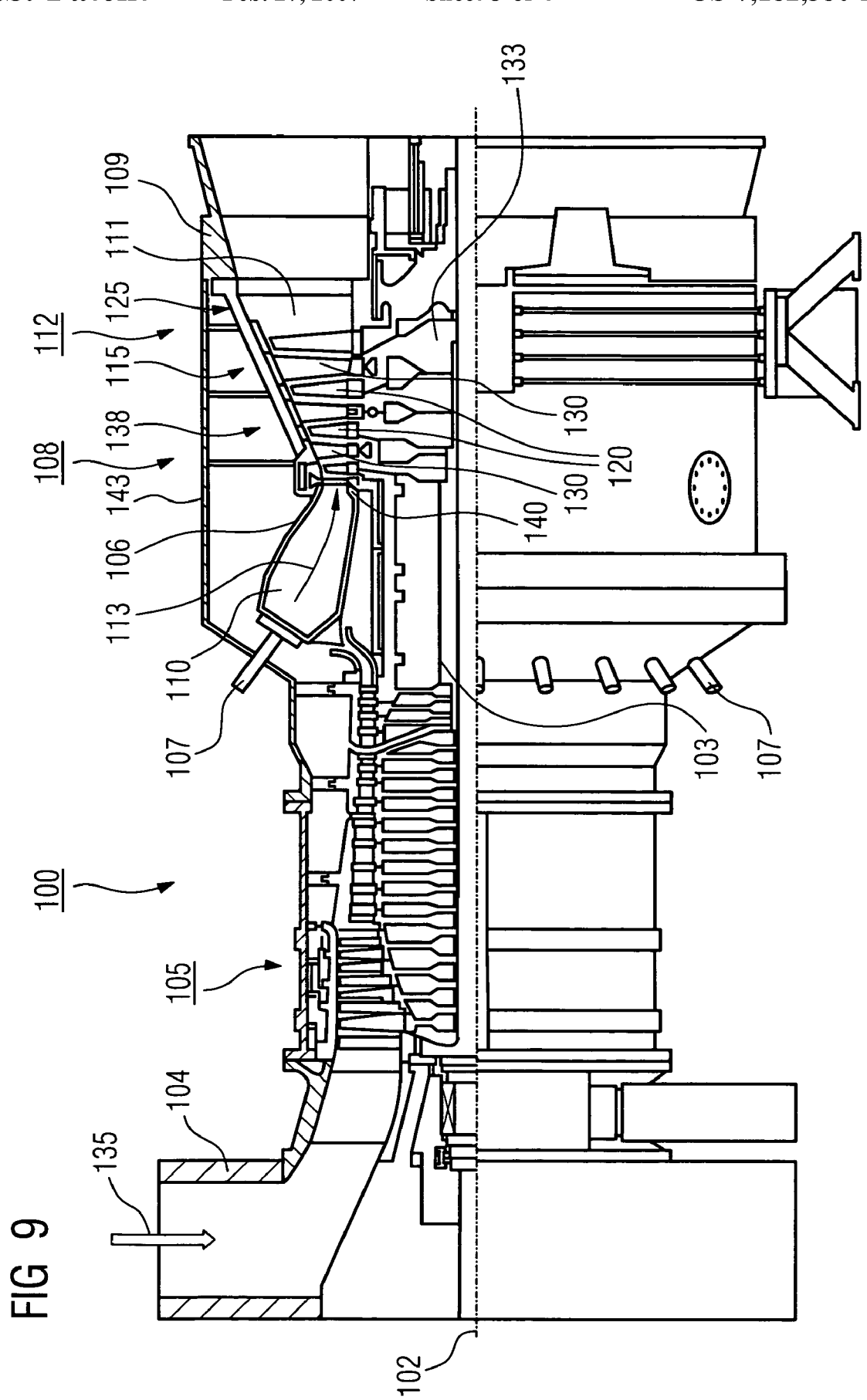
FIG. 9 shows a gas turbine.

FIG. 9 shows a longitudinal part-section through a gas turbine 100. In its interior, the gas turbine 100 has a rotor 103 which is mounted rotatably about an axis of rotation 102 and is also referred to as the turbine rotor. An intake housing 104, a compressor 105, a for example torus-like combustion chamber 110, in particular an annular combustion chamber 106, having a plurality of coaxially arranged burners 107, a turbine 108 and the exhaust-gas housing 109 follow one another along the rotor 103. The annular combustion chamber 106 is in communication with an, for example, annular hot-gas duct 111, where, by way of example, four turbine stages 112, connected in series, form the turbine 108. Each turbine stage 112 is formed from two bladed rings. As seen in the direction of flow of a working medium 113, a row 125 formed from rotor blades 120 follows a row 115 of guide vanes in the hot-gas duct 111.

The guide vanes 130 are secured to the stator 143, whereas the rotor blades 120 belonging to a row 125 are arranged on the rotor 103 by means of a turbine wheel 133. A generator or a machine (not shown) is coupled to the rotor 103.

While the gas turbine 100 is operating, air 135 is sucked in through the intake housing 104 and compressed by the compressor 105. The compressed air provided at the turbine-side end of the compressor 105 is passed to the burners 107, where it is mixed with a fuel. The mixture is then burnt in the combustion chamber 110, so as to form the working medium 113. From there, the working medium 113 flows along the hot-gas duct 111, past the guide vanes 130 and the rotor blades 120. The working medium 113 expands at the rotor blades 120, transferring its momentum, so that the rotor blades 120 drive the rotor 103 and the latter drives the machine coupled to it.

The components which are exposed to the hot working medium 113 are subject to thermal loads while the gas turbine 100 is operating. The guide vanes 130 and rotor blades 120 of the first turbine stage 112, as seen in the direction of flow of the working medium 113, as well as the heat shield bricks lining the annular combustion chamber 106, are subjected to the highest thermal loads. To be able to withstand the prevailing temperatures, these components are cooled by means of a coolant. It is also possible for the blades and vanes 120, 130 to have coatings protecting against corrosion (MCrAlX; M=Fe, Co, Ni, X=Y, rare earths) and heat (thermal barrier coating, for example $ZrO_2$, $Y_2O_4$—$ZrO_2$).

The guide vane 130 has a guide vane root (not shown here) facing the inner housing 138 of the turbine 108 and a guide vane head on the opposite side from the guide vane root. The guide vane head faces the rotor 103 and is fixed to a securing ring 140 of the stator 143.

Figure 10:
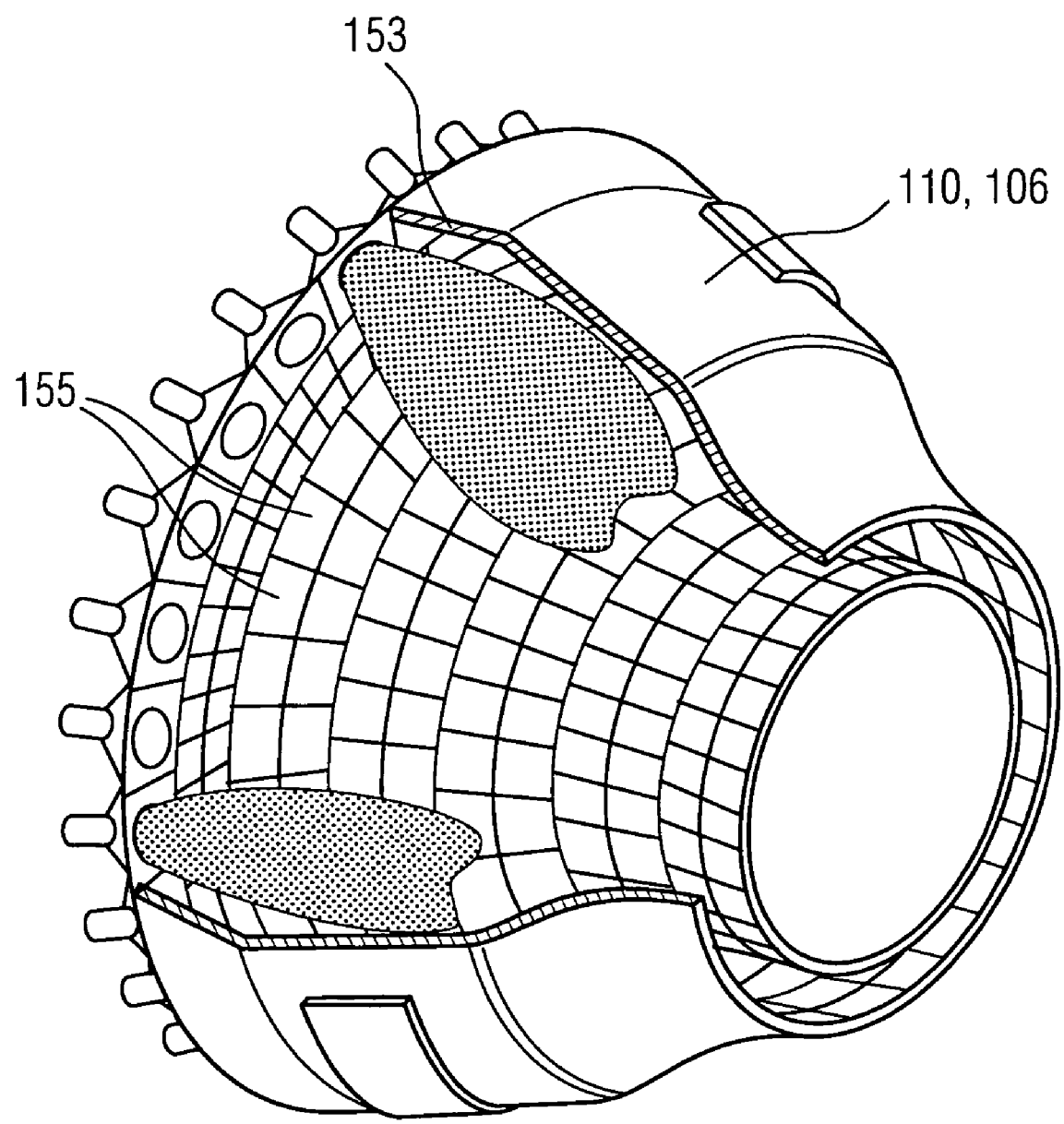
FIG. 10 shows a combustion chamber.

FIG. 10 shows a combustion chamber 110 of a gas turbine 100. The combustion chamber 110 is configured, for example, as what is known as an annular combustion chamber, in which a multiplicity of burners 102, arranged around the turbine shaft 103 in the circumferential direction, open out into a common combustion chamber space. For this purpose, the combustion chamber 110 as a whole is configured as an annular structure positioned around the turbine shaft 103.

To achieve a relatively high efficiency, the combustion chamber 110 is designed for a relatively high temperature of the working medium 113 of approximately 1000° C. to 1600° C. To allow a relatively long operating time to be achieved even under these operating parameters which are unfavorable for the materials, the combustion chamber wall 153 is provided, on its side facing the working medium 113, with an inner lining formed from heat shield elements 155. On the working medium side, each heat shield element 155 is equipped with a particularly heat-resistant protective layer or is made from material which is able to withstand high temperatures. Moreover, on account of the high temperatures in the interior of the combustion chamber 110, a cooling system is provided for the heat shield elements 155 and/or for the holding elements hereof.

The invention claimed is:

1. A component adapted for use in a turbine engine, the component comprising:
   a substrate;
   a bond coat disposed on a surface of the substrate;
   a thermal barrier coating disposed on a surface of the bond coat; and
   a plurality of anchoring elements joined to the surface of the bond coat by a melt metallurgy and extending at least partially through a thickness of the thermal barrier coating for anchoring the thermal barrier coating to the bond coat;
   further comprising the plurality of anchoring elements joined to the surface of the bond coat in a spatially delimited manner corresponding to a region of highest mechanical loading.

2. The component of claim 1, wherein the component comprises a turbine airfoil and the plurality of anchoring elements are joined to the surface of the bond coat in only a leading edge region of the airfoil.

3. The component of claim 1, wherein the anchoring elements comprise one of the group of a circular shape, a stitched seam shape, and a wavy shape.

4. The component of claim 1 wherein the anchoring elements comprise local portions of the thermal barrier coating that has been treated with an energy beam that causes the thermal barrier coating material to melt all the way down to the bond coat surface to form the melt metallurgy joint with the bond coat.

5. A component adapted for use in a turbine engine, the component comprising:
   a substrate;
   a bond coat disposed on a surface of the substrate;
   a thermal barrier coating disposed on a surface of the bond coat; and
   a plurality of anchoring elements joined to the surface of the bond coat by melt metallurgy and extending at least partially through a thickness of the thermal barrier coating for anchoring the thermal barrier coating to the bond coat;
   further comprising a second plurality of anchoring elements joined to the surface of the substrate by a melt metallurgy and extending at least partially through a thickness of the bond coat for anchoring the bond coat to the substrate.

6. The component of claim 5, wherein at least one of the second plurality of anchoring elements extends completely through the thickness of the bond coat and extend into the thermal barrier coating for anchoring the thermal barrier coating to the substrate and the bond coat.

7. A component adapted for use in a turbine engine, the component comprising:
   a substrate;
   a coating disposed on a surface of the substrate; and
   a plurality of anchoring elements joined to the surface of the substrate in a spatially delimited manner corresponding to a region of highest mechanical loading in the coating by a melt metallurgy and extending at least partially through a thickness of the coating for anchoring the coating to the substrate.

8. The component of claim 7, wherein the component comprises a turbine airfoil and the plurality of anchoring elements are joined to the surface of the substrate in only a leading edge region of the airfoil.

9. The component of claim 7, wherein the coating comprises a bond coat disposed on a surface of the substrate and a thermal barrier coating disposed on a surface of the bond coat, and further comprising a second plurality of anchoring elements joined to the surface of the bond coat in the spatially delimited manner corresponding to the region of highest mechanical loading in the coating by a melt metallurgy and extending at least partially through a thickness of the thermal barrier coating for anchoring the thermal barrier coating to the bond coat.

10. The component of claim 9, wherein the second plurality of anchoring elements comprise local portions of the thermal barrier coating that has been treated with an energy beam that causes the thermal barrier coating material to melt all the way down to the bond coat surface to form the melt metallurgy joint with the bond coat.

11. A process for producing a coated component, the process comprising:

depositing a coating onto a surface of a substrate; and treating portions of the coating with an energy beam that causes respective portions coating material to melt all the way down to the substrate surface to form a plurality of anchoring elements in the coating having a melt metallurgy joint with the substrate to anchor the coating to the substrate.

12. The process of claim 11, further comprising:

depositing a bond coat onto the surface of the substrate;

depositing a thermal barrier coating onto the surface of the bond coat; and treating portions of the thermal barrier coating with the energy beam to cause respective portions of the thermal barrier coating material to melt all the way down to the surface of the bond coat to form the plurality of anchoring elements in the thermal barrier coating to have a melt metallurgy joint with the bond coat to anchor the thermal barrier coating to the bond coat.

13. The process of claim 11, further comprising treating the portions of the coating with the energy beam in a spatially delimited manner to form the plurality of anchoring elements in a region corresponding to a region of highest mechanical loading in the coating.

14. The process of claim 11, further comprising treating the portions of the coating to form the anchoring elements in at least one of a circular shape, a stitched seam shape, and a wavy shape.

* * * * *